Sept. 20, 1966    L. J. HOLT ETAL    3,273,835
SELF-EJECTING EMERGENCY CHUTE RECOVERY SYSTEM
Filed May 19, 1964    2 Sheets-Sheet 1
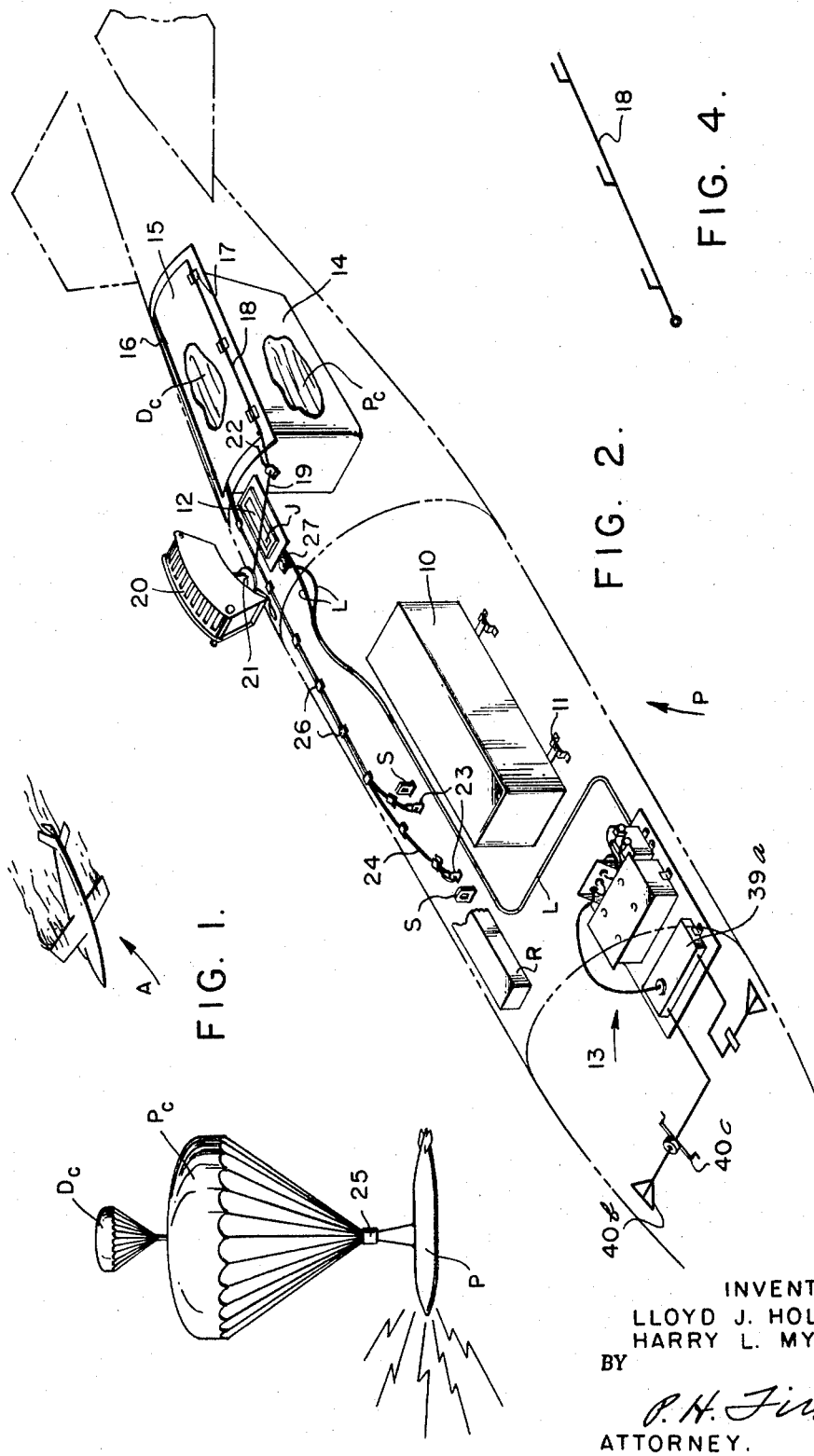
INVENTORS.
LLOYD J. HOLT
HARRY L. MYERS
BY
*P. H. First*
ATTORNEY.

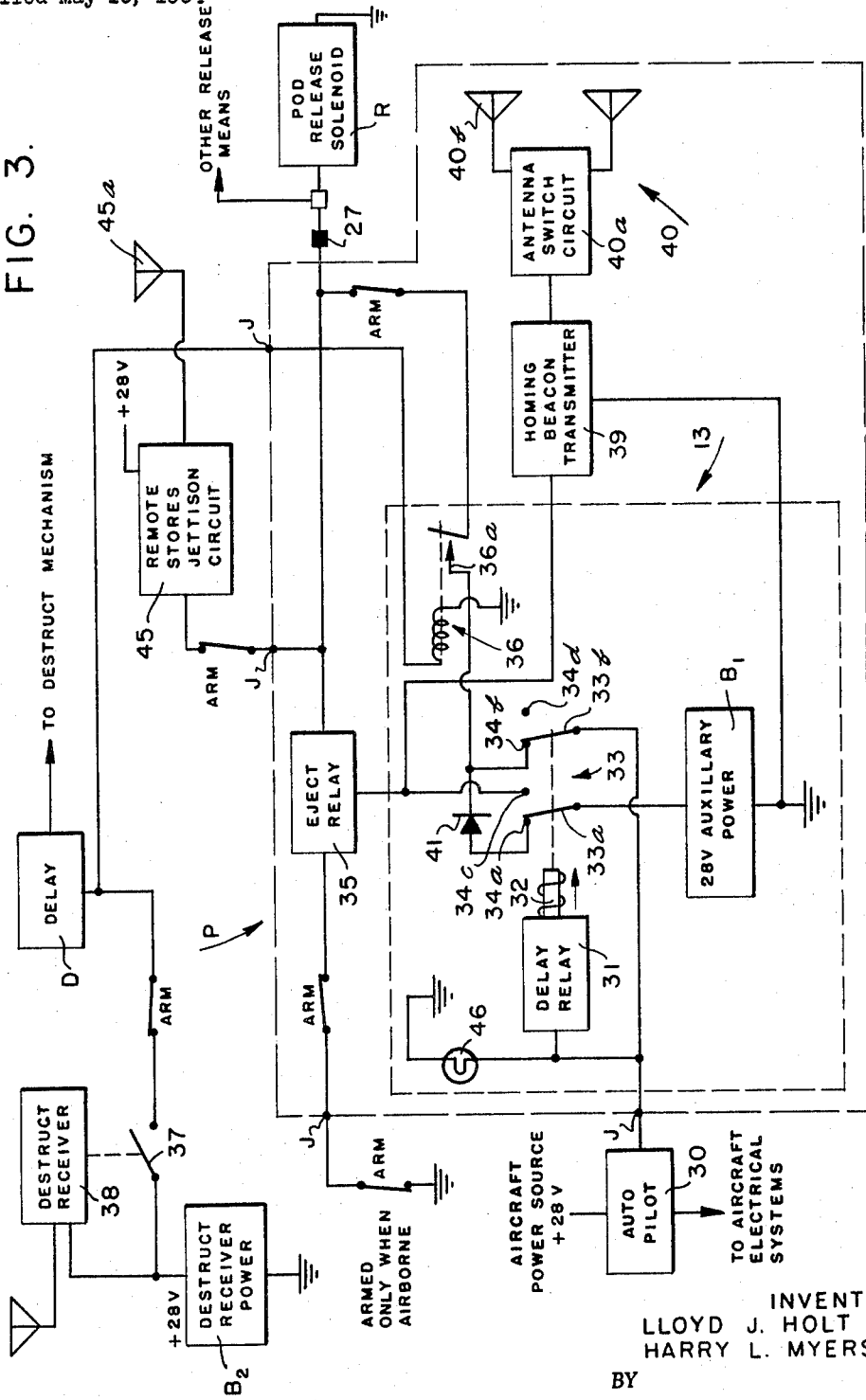

United States Patent Office 3,273,835
Patented Sept. 20, 1966

3,273,835
SELF-EJECTING EMERGENCY CHUTE
RECOVERY SYSTEM
Lloyd J. Holt, Ridgecrest, and Harry L. Myers, China Lake, Calif., assignors to the United States of America as represented by the Secretary of the Navy
Filed May 19, 1964, Ser. No. 368,723
5 Claims. (Cl. 244—138)

The invention described herein may be manufactured and used by or for the Government of the United States of America for governmental purposes without the payment of any royalties thereon or therefor.

The present invention relates to a system for recovering instrument packages of various types which are carried by target drone aircraft for purposes of monitoring incoming missiles and the like fired at the drone during the normal research and development stages for various types of armament.

During the development stages for various types of armament, it often is found necessary to fire the armament at airborne aircraft and monitor the armament's in-flight angle of attack, trajectory, miss-distance and other vital characteristics as it approaches the target aircraft. This requires that expensive and complex monitoring devices and systems be carried by the target itself so that the information may be recorded and/or telemetered to ground control or other monitoring stations.

As a target drone is often destroyed by a "hit," or must be destroyed subsequent to "losing" control contact with ground control or chase plane operator, it is highly desirable to provide means for preserving and recovering the instrument package in-tact, so that instrument data may be studied and the package reused. This is feasible due to the fact that the package will oftentimes be un-touched by the armament and will escape destruction, unless it is permitted to accompany the target during its "crash."

Various means and systems are well-known for delivering cargo from airborne vehicles. However, none of these systems are capable of providing the necessary means for automatically ejecting instrument packages in response to predetermined conditions existing aboard unmanned or drone aircraft. Further, a target normally will be "hit" over vast and extremely rough and uninhabitable target area and, as is the usual case, will continue in flight for various periods of time in unpredictable directions. Consequently, retrieval of the package has heretofore been an almost impossible task because the pod becomes lost once it has been ejected from the drone. This result is due primarily to the fact that no suitable, inexpensive and effective means heretofore existed which would respond to conditions aboard the drone for ejecting the pod and indicating the geographical location of the pod during its descent and subsequent to impact with the ground.

Therefore it is the purpose of the instant invention to provide a practical and economic system for monitoring in-flight conditions aboard a target drone which will respond to power failures on the drone electrical system or to drone destruct signals and which will eject the instrument package and automatically initiate a transmission of homing beacon signals from the package container pod as it descends, and subsequent to impact, so that the package may be located and recovered in an in-tact condition.

An object of the present invention is to provide a practical and economic system, which utilizes equipment normally provided for drone aircraft for ejecting instrument package container pods and initiating deployment of the pods parachute as well as initiating pod homing beacon signals.

Another object is to provide a simple and economic control system which monitors and responds to power failure to a target drone's electrical system and, further, monitors and responds to incoming drone destruct signals for ejecting an instrument package container pod, initiating pod parachute deployment, and causing homing beacon signals to be transmitted in the event that either a "hit" is made on the drone or flight termination destruct signals are received aboard the drone for initiating destruction thereof.

A further object is to provide a simple and economic system for target drones, which functions to release an instrument container pod, in response to either destruct signals received at the drone or power failure occuring in in the drone's automatic pilot, initiate a deployment of the pod's parachute, and cause homing signals to be transmitted from the pod as it descends and after it comes to rest, subsequent to impact, whereby an instrument package may be successfully and automatically ejected from an unmanned drone, before the drone is destroyed, parachuted to the ground, and caused to provide homing beacon signals to guide search parties for recovery purposes.

Other objects, advantages and novel features of the invention will become apparent from the following detailed description of the invention when considered in conjunction with the accompanying drawings wherein:

FIG. 1 is a schematic view of an ejected container pod during descent;

FIG. 2 is a schematic view of the instrument container pod of FIG. 1, shown in phantom and on an enlarged scale, with various system components mounted therein;

FIG. 3 is a block diagrammatic view of the system of the instant invention, including the components of the system normally mounted within the drone aircraft, as well as those mounted within the container pod; and FIG. 4 is an enlarged view of the release pin shown in FIG. 2.

Referring now to the drawings, wherein like reference characters designate like or corresponding parts throughout the several views, there is shown in FIG. 1 a descending instrument container pod P, which has been ejected from an aircraft A utilizing the system of the instant invention, supported by a parachute Pc.

Turning now to FIG. 2, the pod P is provided with an aerodynamic configuration and is illustrated as being disposed in an aircraft mated position, relative to a given aircraft. For simplicity, illustration of the aircraft A has been eliminated from FIG. 2. While any suitable package may be mounted by any suitable means and contained within the pod P, a simple package 10 is illustrated as being supported by mounting means 11. Since the specific instrument package transported by the pod P may be varied and forms no part of the instant invention, a detailed description thereof is omitted in the interest of brevity.

The pod P is provided with a surface-mounted umbilical receptical 12, which provides suitable junction terminals J, whereby the components of the electrically operated system transported by the pod P may be connected with various components and systems mounted in and transported by the drone, as will hereinafter be more fully described. A plurality of leads L extend from the receptical 12 and are connected with a mounting panel and circuit boxes, generally designated 13, which serve to mount the major electrical system components. It is to be understood that the pod P is provided with the necessary access doors or openings for accommodating access to the interior of the pod P.

Mounted along the uppermost surface of the pod P is a pair of shackels S, which serve to connect the pod P to an external bomb rack, not shown, normally provided for many types of military aircraft. The shackels S are provided with "eyes," not designated, through which the pins of an electrically operated bomb rack are passed for securing the pod P to the aircraft. The bomb racks are conventionally operated through release solenoids, designated R, FIGS. 2 and 3, which serve to withdraw the pins from the "eyes" of the shackel S to thus permit the pod P to drop in a free-fall manner from the aircraft.

Mounted near the aft end of the pod P is parachute storage container 14 having disposed therein a normally folded parachute Pc, provided with a conventional spring-loaded drogue "chute" Dc attached thereto for purposes of withdrawing the parachute Pc from the container in a conventional manner. The container 14 is closed by means of a spring-loaded parachute deployment door 15. The door 15, when opened, permits the spring-loaded drogue "chute" Dc to be ejected into the airstream for drawing the parachute Pc from its container to become fully deployed and reduce the rate of descent for the pod P.

The door 15 is normally biased opened by a conventional spring-loaded hinge pin 16, and normally is retained in a closed condition through a plurality of hasps 17 and a bifurcated release pin 18, FIG. 4, passing therethrough. Secured to the forward end of the pin 18 is a release cable 19 which serves to draw the pin 18 free of the hasps 17 thus permitting the spring-loaded hinge pin 16 to "snap open" door 15 to accommodate parachute deployment. In order for the door to be opened in free-fall at proper distance from the drone, once the pod is released, the cable 19 is of a predetermined length and stored in a cable stowage rack 20 fixed to the aircraft or self-contained in pod P. The rack 20 functions to retain and subsequently pay-out the cable 19 to its fully extended condition, after the pod P has been released for free-fall.

At the end of cable 19, opposite the pin 18, there is provided suitable means which serve to secure the cable 19 to the aircraft. The cable 19 is fed from the rack 20 through a bearing-surfaced guide 21 and a cable guide shear-connector 22 to be secured to the pin 18. The shear-connector 22 serves to insure an initial withdrawal of the pin 18 in longitudinal direction so that the pin will clear the hasps 17 as the cable 19 becomes fully extended. Once the pin 18 is clear of the hasps 17 the tension applied to the cable 19 serves to shear the shear-connector 22 from the pod P for thus permitting the pod to fall completely free of the aircraft.

Mounted along the uppermost surface of the pod P is a pair of parachute riser attach bolts 23. Where desired, the bolts 23 may be aligned with the shackels S so that the pod P will be caused to descend in approximately the same relative disposition as it assumed when mated with the aircraft. Attached to the riser attach bolts 23 is a pair of parachute riser cables 24, which extend into the parachute stowage container 14 in a coupled relationship with shrouds of the parachute. The riser cables and shrouds are coupled through a conventional quick disconnect or coupling block 25, FIG. 1, which permits the riser cables 24 and the parachute to part once the pod P settles to the ground. In order to maintain the riser cables in a stowed condition during flight, a plurality of shear-clips 26 are provided to fasten the cables 24 to the body or surface of the pod P. It is to be understood that once the pod P falls free of the aircraft and the drogue "chute" begins to deploy the parachute, tension is applied to the cables 24, whereupon the cables are "snapped" free, or sheared, from the clips 26 for thus permitting the pod P and parachute Pc to assume the proper descent dispositions, as illustrated in FIG. 1.

In order to effect aircraft or drone release of the pod P at a desired instant, the system of the present invention is provided with a pair of monitoring circuits, which respond automatically to conditions existing aboard the aircraft and apply power to the release solenoid R through a bomb rack receptacle 27 for initiating a release of the pod P, as well as initiating a continuous homing or beacon signal transmission from the pod as it descends. These circuits are better illustrated by the block diagram of FIG. 3.

A portion of the system serves to monitor the power applied to and through the drone's auto-pilot 30, mounted within the drone aircraft. As the auto-pilot 30 is disposed at the very "heart" of the drone's guidance system, a power failure occurring in this circuit causes a loss of aircraft control, whereupon the drone may be expected to ultimately destroy itself through impact with the ground. However, it is necessary to eject the pod P as soon as it is determined that there is in fact a loss of such power. Since the loss of power may not be readily apparent to operators located at the drone control station, or in chase planes, the system must be depended upon to first determine power loss and then initiate a release of the pod. This is accomplished through a five-second delay relay 31 of any suitable and known design, connected with the auto-pilot 30. The relay 31 controls a switching solenoid 32, which in turn retains a pair of switch arms 33a and 33b of a double-pole, double-throw switch 33 in a predetermined disposition against contacts 34a and 34b, respectively, so long as power is applied to the relay. The arm 33a, of the switch 33, is connected in series with a +28 volt auxiliary power source $B_1$, while the arm 33b is connected with the auto-pilot 30. The five-second delay mechanism is provided to insure that failure of power through the auto-pilot 30 is more than a temporary condition which will abate without loss of drone control.

Once the solenoid 32 becomes inactivated, the arms 33a and 33b of the switch 33 are spring biased out of engagement with the contacts 34a and 34b and into engagement with contacts 34c and 34d. Contact 34d serves to provide an open circuit from the auto-pilot 30, while contact 34c is connected to eject relay 35. The relay 35 is of any suitable and known design and is connected in series with the pod release solenoid R so that when it becomes energized, a series circuit is completed between the +28 volt auxiliary power source $B_1$, the solenoid R, and ground potential for thus causing the solenoid R to be activated and the pod P to be relased in response thereto, through a withdrawal of the bomb rack pins from the shackels S.

When the arms 33a and 33b of the switch 33 are positioned to engage contacts 34a and 34b, a circuit is established through the auto-pilot 30 between the aircraft's +28 volt power source and a pre-destruct ejection relay switch 36a of a relay 36 for applying aircraft power thereto. The relay 36 serves to close a normally open circuit between the aircraft's power source and the pod release solenoid R. However, the relay 36 is operatively connected with a destruct +28 volt power source $B_2$ through a normally open solenoid controlled switch 37, which is operatively closed when destruct signals are received at a destruct receiver circuit 38. The switch 37 is closed to complete a circuit from power source $B_2$ to the relay 36 and to a parallel connected destruct circuit and mechanism, which functions to destroy the aircraft, or drone, on command from the aircraft's control center. As the destruct circuit, mechanism, and receiver form no part of the present invention, a detailed description is omitted in the interest of brevity. It is to be understood, however, that there is provided a series connected delay circuit D which introduces a period of predetermined delay between the closing of the switch 37 and the operation of the destruct mechanism. This period of delay is sufficient to permit the pod P to fall free of the aircraft, subsequent to a closing of the switch 37 and prior to destruction of the drone aircraft.

When a circuit is completed through switch 37, the relay 36 is activated to close the switch 36a to thus complete a series circuit to the pod release solenoid R, whereupon the pod P is released through an activation of the pod release solenoid functioning in the aforedescribed manner.

As hereinbefore mentioned, pod ejection and parachute opening mechanisms do not serve to provide a satisfactory and complete recovery system, since there normally exists the probability that the pod P will not be located once it has been ejected unless means are provided to indicate its geographical location during descent and subsequent to impact. Therefore, a simple homing beacon transmitter 39, antenna circuit 40, including a switching circuit 40a and an antenna 40b, which radiates in a plurality of directions, has been included in the system. The antenna 40b may be of any suitable type mounted within the pod P by any suitable means as depicted at 40c, FIG. 2.

The transmitter 39 is mounted in housing 39a, FIG. 2, and is of conventional design and operates at a given frequency, whereby its output may be readily distinguished under prevailing operating conditions. The switching circuit 40a serves to alternately drive the antennas 40b, in a conventional manner, so that the signals from the pod P may be received at various locations, relative to the pod's geographical location.

In order to become activated for transmission, the transmitter 39 responds to a closing of the circuit between the auxiliary +28 volt power supply, or source $B_1$, and terminal 34c as the solenoid 32 functions to operate the switch 33, whereby power may be supplied to the transmitter from source $B_1$. It is to be noted that should the pod P has been ejected, due to the delay imposed by the destruct receiver 38, as aforedescribed, the transmitter 39 will not be activated until five seconds after the pod P has been ejected, due to the delay imposed by the delay relay circuit 31, subsequent to a severance of the leads at receptacle 12. As a practical matter, this delay has been considered to be insignificant. It is to be further noted that when a circuit is completed between the power source $B_1$ and switch 36a, a circuit is also completed through the auto-pilot from the aircraft power source to the power source or battery $B_1$. Hence, it has been found desirable to include a solid state unilateral conductor 41 between the contact terminals 34a and 34b in order to protect the battery $B_1$.

Where desired, a remote stores jettison circuit 45 and receiving antenna 45a may be included in the circuit to receive signals from the ground and apply +28 volts aircraft power to the pod release solenoid R for causing it to release the pod P in a conventional manner. This system may be employed as a matter of convenience, and functions in instances where there has been no power failure at the auto-pilot 30 and the aircraft is not to be immediately destroyed by the drone destruct mechanism.

For purposes of testing the various components and to serve as safety devices, a plurality of arming switches, designated ARM, may be included in the circuit at appropriate locations. Further, an arming light 46 may be included in the circuit to indicate that aircraft power is being applied to the circuit, prior to arming the circuit through closing the arming switches, to thus insure against an undesired activation of switch 33.

With the drone being airborne, and with all arming switches being positioned to a closed position, and power being applied to and through the auto-pilot 30, the operation of the system may be initiated in any one of three ways: First, a power failure at the auto-pilot 30 will, after a five-second delay, serve to cause a circuit to be completed through the eject relay 35 and the pod release solenoid R, for causing an activation of the solenoid R and a resulting release of the pod P; second, in instances where power is being applied through the auto-pilot 30, but the aircraft remote control stores jettison 45 is unobtainable, a destruct signal may be transmitted to the destruct receiver 38 for purposes of terminating the drone aircraft's flight. This may be occasioned by destroying the drone, or portions thereof, for thus causing the drone to impact or to "crash." Signals received at receiver 38 serve to cause switch 37 to close, which in turn causes switch 36 to close. As switch 36 closes, aircraft power and/or power from the power source $B_1$ is then applied to the pod release solenoid R for initiating a release of pod P. It is to be noted that once switch 37 is closed for completing the destruct circuit, flight termination is imminent. Therefore, in utilizing both the aircraft power source, as applied through the auto-pilot 30, and the auxiliary power source $B_1$, the aircraft power source may be considered the "primary" power source, while the source $B_1$ may be considered the "stand-by" power source. Consequently, ejection of pod P may be assured even though a power failure occurs at the auto-pilot 30 after the switch 37 is closed; and third, a stores jettison signal may be transmitted to the remote stores jettison circuit 45 for causing power to be applied to the release solenoid R for in turn causing the pod P to be released.

Immediately upon a circuit being closed between the source $B_1$ and the terminal contact 34c, the transmitter 39 begins to radiate homing beacon signals, which may be picked up by search parties to aid in geographically locating the ejected pod P.

Upon release from the bomb rack, the pod P falls free of the drone aircraft A, thus severing the umbilical cord and circuit leads to the bomb rack. As the pod P is separated from the drone aircraft A, the deployment cable 19 pays out until it is drawn taut, whereupon the release pin 18 is drawn from the hasps 17, shears the connector 22, and allows the spring-loaded hinge pin 16 to open the door 15. As the door 15 "snaps" open, the spring-loaded drogue chute Dc is forced out of the container 14 for subsequently deploying the parachute Pc. As the parachute Pc is deployed the risers 24 are drawn taut and shear from the shear-clips 26, for thus permitting the pod P to assume a proper descent disposition. Once the pod P settles to the ground the coupling block 25 immediately releases, in a conventional manner, thus assuring a release of the pod P from the parachute Pc to prevent the pod P from being taken along with the parachute Pc and damaged as the parachute collapses. The homing beacon signals continue radiating from the transmitter 39 so that the search party may now locate the pod P and recover the instrument package intact.

In accordance with the foregoing description, it is to be understood that the instant invention provides a simple, economical, and highly dependable instrument package recovery system that is readily applicable to various types of target drone aircraft and which makes use of structure and circuit components normally found in conventional drone aircraft.

Obviously many modifications and variations of the present invention are possible in the light of the above teachings. It is therefore to be understood that within the scope of the appended claims the invention may be practiced otherwise than as specifically described.

What is claimed is:

1. A recovery system for an airborne instrument package comprising:
   an elongated aerodynamically-shaped container pod;
   means for mounting an instrument package therein;
   means fixed to said pod for connecting the pod to an external, electrically operable bomb rack fixed to a transporting aircraft;
   a power monitoring device including an auxiliary source of operation potential and a time delay circuit mounted within said pod;
   current conducting means connecting said time delay circuit of the monitoring device with an automatic pilot mounted in said transporting aircraft adapted for monitoring power applied through said automatic pilot, whereby power failure occurring at the automatic pilot may be detected at the monitoring device;
   means operatively connecting said monitoring device with said electrically operable bomb rack;

operative means disposed within said monitoring device connected with said delay circuit to initiate a delayed releasing operation of said electrically operable bomb rack in response to power failure occurring at said automatic pilot, whereby said pod may be released for free-fall from said aircraft in response to a power failure occurring at said automatic pilot;

a parachute stowage container mounted in said pod;

a parachute disposed within said stowage container adapted to be drawn therefrom;

means defining a spring-loaded door mounted on said stowage container for retaining said parachute therein;

a slidingly removable release pin adapted to be frictionally maintained in an operative disposition to retain said spring-loaded door in a closed disposition and to be slidingly displaced to release the door for opening;

a pair of parachute riser cables connecting said parachute with said pod in a manner such that the pod may be suspended from said parachute and maintained in a desired disposition thereby during descent;

a cable stowage rack mounted on said aircraft;

a cable of a predetermined length disposed within said stowage rack;

means fixing one end of said cable to the aircraft and the opposite end thereof to said release pin so that as the pod is released for free-fall from said aircraft through an activation of said bomb rack, said cable may become operative for slidingly displacing said release pin to permit the spring-loaded door to open and the parachute to be withdrawn from said stowage container and deployed to support the pod during descent; and a homing signal circuit including a beacon transmitter, antenna, and an antenna switching circuit mounted in said pod, connected with said monitoring device and adapted to respond to an activation thereof to provide transmitted homing signals from said pod subsequent to an activation of said bomb rack.

2. The system of claim 1 wherein the monitoring device further includes:

destruct signal monitoring means electrically connected with a system connected destruct signal receiver for detecting destruct signals received at the destruct receiver;

solenoid means connected with said destruct signal monitoring means adapted to operatively respond to destruct signals received at the destruct receiver;

an electrical circuit means including a normally open circuit closing switch connecting said electrically operable bomb rack and said current conducting means; and means operably connecting said solenoid means with said circuit closing switch.

3. The system as defined in claim 2 being further characterized in that said operative means disposed within said monitoring device includes:

a circuit closing switch for connecting said auxiliary source of operative potential with an eject relay for initiating a releasing operation of said electrically operative bomb rack and activating said homing beacon transmitter.

4. A recovery system for drone transported instrument package, comprising:

a power failure responsive means connected with a guidance circuit for a transporting drone and adapted to be activated in response to power failure occurring within the guidance circuit;

destruct signal responsive means connected to a drone destruct signal receiver;

an instrument package container;

an electrically responsive mounting means for releasably mounting said container externally of said drone;

at least one source of operative potential;

switch means connected with said power failure responsive means adapted to be displaced by said power failure responsive means for completing an electrical circuit between said source of operative potential and said electrically responsive mounting means for initiating a release of said container in response to activation of said power failure responsive means;

switch means connected with said destruct signal responsive means adapted to be displaced by said destruct signal responsive means for completing a circuit between said source of operative potential for initiating a release of said container in response to activation of said signal responsive means;

a parachute having shrouds connected with said container;

means functioning in response to an initiated release of said container for initiating a deployment of said parachute; and means connected with said power failure responsive means for transmitting beacon signals from said container.

5. In a pod recovery system:

a pod;

an electrically operable pod mounting means adapted to releasably mount said pod on an airborne vehicle and release said pod in response to a flow of electrical current;

a source of electrical current;

means including a plurality of normally open switches connecting said source of a current with said mounting means;

switch closing means connected between said pod mounting means and said source of electrical power;

first means adapted to activate said switch closing means in response to destruct signals transmitted to vehicle;

second means adapted to activate said switch closing means in response to power failure occurring aboard said vehicle;

means adapted to transmit a beacon signal from said pod in response to an activation of said second means;

a parachute connected with said pod; and means adapted to deploy said parachute in response to a release of said pod by said mounting means.

References Cited by the Examiner

UNITED STATES PATENTS 2,505,950   5/1950   Dwyer et al. _____ 244—136
3,140,847   7/1964   Ames _____ 244—138

FERGUS S. MIDDLETON, *Primary Examiner.*